(12) United States Patent
Hayakawa et al.

(10) Patent No.: US 7,543,083 B2
(45) Date of Patent: Jun. 2, 2009

(54) METHOD, APPARATUS AND COMPUTER PRODUCT FOR IDENTIFYING THE TYPE OF PERIPHERAL

(75) Inventors: Tasuku Hayakawa, Kawasaki (JP); Hiroyuki Maekawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 467 days.

(21) Appl. No.: 11/027,986

(22) Filed: Jan. 4, 2005

(65) Prior Publication Data

US 2006/0069949 A1    Mar. 30, 2006

(30) Foreign Application Priority Data

Sep. 10, 2004    (JP)    ............... 2004-264266

(51) Int. Cl.
*G06F 3/00* (2006.01)
*G06F 9/00* (2006.01)
*G06F 9/24* (2006.01)
*G06F 15/177* (2006.01)
*G06F 1/24* (2006.01)

(52) U.S. Cl. .............. 710/8; 713/1; 713/2; 713/100
(58) Field of Classification Search ............ 710/8
See application file for complete search history.

(56) References Cited

U.S. PATENT DOCUMENTS

| | | | | |
|---|---|---|---|---|
| 5,339,432 A | * | 8/1994 | Crick | 713/1 |
| 5,933,652 A | * | 8/1999 | Chen et al. | 710/1 |
| 5,943,029 A | * | 8/1999 | Ross | 345/11 |
| 5,999,989 A | * | 12/1999 | Patel | 710/1 |
| 6,753,881 B1 | * | 6/2004 | Callway et al. | 345/699 |
| 7,007,159 B2 | * | 2/2006 | Wyatt | 713/1 |
| 7,216,184 B2 | * | 5/2007 | Milner et al. | 710/10 |

FOREIGN PATENT DOCUMENTS

| | | |
|---|---|---|
| JP | 2000-112764 | 4/2000 |
| JP | 2001-20231 | 7/2001 |
| JP | 2002-318694 | 10/2002 |

OTHER PUBLICATIONS

Japanese Office Action issued on Mar. 2, 2009 in corresponding Japanese Patent Application 2004-264266.

* cited by examiner

*Primary Examiner*—Henry W. H. Tsai
*Assistant Examiner*—Michael Sun
(74) *Attorney, Agent, or Firm*—Staas & Halsey LLP (57) ABSTRACT

An apparatus for identifying a type of a peripheral connected to an information processing apparatus includes a peripheral-information reading unit that reads information relating to the peripheral from the information processing apparatus using at least one of systems whose application order is predetermined; a peripheral-information storing unit that stores in advance specification information of a peripheral to be connected to the information processing apparatus; and a peripheral-type identifying unit that collates the information read by the peripheral-information reading unit with the specification information stored in the peripheral-information storing unit to identify the type of the peripheral connected to the information processing apparatus.

21 Claims, 9 Drawing Sheets

METHOD, APPARATUS AND COMPUTER PRODUCT FOR IDENTIFYING THE TYPE OF PERIPHERAL

BACKGROUND OF THE INVENTION

1) Field of the Invention

The present invention relates to a technology for identifying a type of a peripheral connected to an information processing apparatus.

2) Description of the Related Art

In recent years, personal computers are generally shipped in a state that not only an operating system (OS) but also software such as various applications and drivers are preinstalled into them. Even when the software is preinstalled into personal computers manufactured by one manufacturer, types and combinations of the software vary according to models of the personal computers. Accordingly, many variations are present.

In order to install the software into personal computers, it is necessary to execute installers for the software. Conventionally, in factories from which personal computers are shipped, since the work for installing various types of software is automated, installer executing programs that sequentially execute the installers are prepared for respective models. As personal computers of different models are being developed, however, types of the required installer executing programs have been increased. The load required for creating and managing the programs have been increased accordingly.

To deal with the above problems, there is disclosed a system in which a versatile installer executing program that can be applied to a plurality of models is created. In this system, the installer executing program identifies a constitution of a device into which the program is installed, and an installer of the software according to the identified device constitution is executed (see, for example, Japanese Patent Application Laid-open No. 2002-318694).

When the technique disclosed in the above literature is utilized, it is very important to accurately identify a constitution of a device where installation is carried out. A variety of devices to be connected to personal computers are present, but if they cannot be accurately identified, software to be installed cannot be selected suitably.

For example, a variety of monitors with different resolution that are connected to personal computers are present, and thus it is necessary to install drivers according to the types. In the case of general external monitors, the types of the monitors can be specified by communication with the monitors using a standard such as display data channel (DDC). However, since desktop personal computers with monitors, such as laptop personal computers, and some external monitors are not compatible with the DDC, the personal computers themselves should identify the types of the monitors and install drivers according to the monitors.

When, therefore, such monitors are used, the versatile installer executing program disclosed in the above literature cannot be applied to the installation of the drivers, and thus an installer executing program has to be created for each type, same as the conventional technique.

SUMMARY OF THE INVENTION

It is an object of the present invention to solve at least the above problems in the conventional technology.

A peripheral-type identifying apparatus according to one aspect of the present invention, which is for identifying a type of a peripheral connected to an information processing apparatus, includes a peripheral-information reading unit that reads information relating to the peripheral from the information processing apparatus using at least one of systems whose application order is predetermined; a peripheral-information storing unit that stores in advance specification information of a peripheral to be connected to the information processing apparatus; and a peripheral-type identifying unit that collates the information read by the peripheral-information reading unit with the specification information stored in the peripheral-information storing unit to identify the type of the peripheral connected to the information processing apparatus.

A peripheral-type identifying method according to another aspect of the present invention, which is for identifying a type of a peripheral connected to an information processing apparatus, includes reading information relating to the peripheral from the information processing apparatus using at least one of systems whose application order is predetermined; and collating the information read at the reading with specification information stored in a peripheral-information storing unit that stores the specification information of a peripheral to be connected to the information processing apparatus to identify the type of the peripheral connected to the information processing apparatus.

A computer-readable recording medium according to still another aspect of the present invention stores a computer program that causes a computer to execute the above peripheral-type identifying method according to the present invention.

An information processing apparatus according to still another aspect of the present invention, which identifies a type of a peripheral connected to an information processing apparatus, includes a peripheral-information reading unit that reads information relating to the peripheral from the information processing apparatus using at least one of systems whose application order is predetermined; a peripheral-information storing unit that stores in advance specification information of a peripheral to be connected to the information processing apparatus; and a peripheral-type identifying unit that collates the information read by the peripheral-information reading unit with the specification information stored in the peripheral-information storing unit to identify the type of the peripheral connected to the information processing apparatus.

The other objects, features, and advantages of the present invention are specifically set forth in or will become apparent from the following detailed description of the invention when read in conjunction with the accompanying drawings.

DETAILED DESCRIPTION

Exemplary embodiments of a peripheral-type identifying apparatus, a peripheral-type identifying method, and a computer product according to the present invention will be explained below in detail with reference to the accompanying drawings. While the peripheral-type identifying apparatus, the peripheral type identifying program, and the peripheral-type identifying method are applied to determinations of a type of a monitor connected to a personal computer in this explanation, they may be also applied to determinations of a type of a monitor connected to an information processing apparatus other than personal computers.

Figure 1:
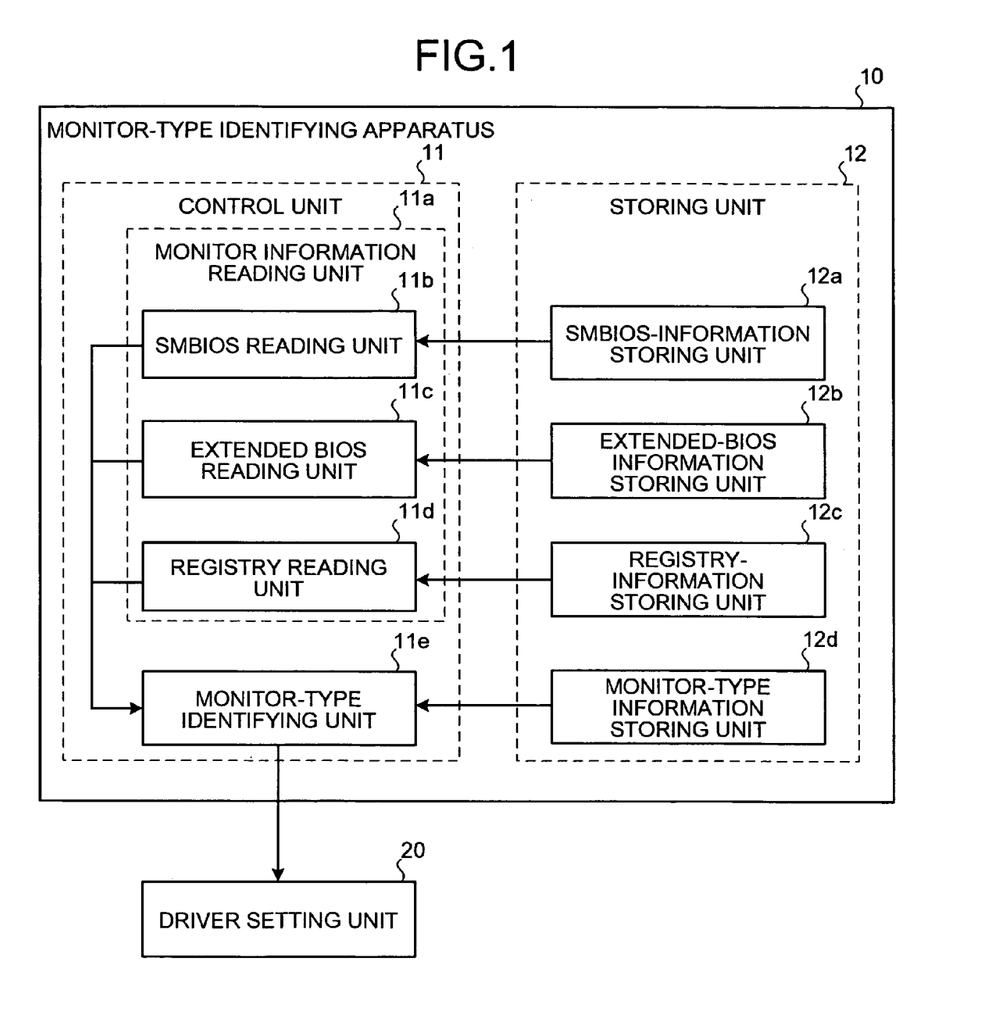
FIG. 1 is a block diagram of a constitution of a monitor type identifying apparatus according to an embodiment of the present invention.

FIG. 1 is a block diagram of the constitution of the monitor type identifying apparatus according to the present embodiment. As shown in FIG. 1, a monitor type identifying apparatus 10 is connected to an external processor such as a driver setting unit 20, and has a function that provides an identified result of the monitor type to the external processor.

The monitor type identifying apparatus 10 has a controller 11 and a storage unit 12. The controller 11 entirely controls the monitor type identifying apparatus 10, and has a monitor information reading unit 11a including a SMBIOS reading unit 11b, an extended BIOS reading unit 11c, and a registry reading unit 11d, and a monitor type identifying unit 11e. The storage unit 12 has an SMBIOS information storage unit 12a, an extended BIOS information storage unit 12b, a registry information storage unit 12c, and a monitor type information storage unit 12d.

The SMBIOS reading unit 11b is a processor that reads information stored in the SMBIOS information storage unit 12a, and acquires monitor information in the read information. SMBIOS is a standard that identifies a recording format of system management information such as a device constitution in a system into a nonvolatile memory or the like and a system that reads the system management information. Current personal computers widely and regularly adopt SMBIOS.

The SMBIOS information storage unit 12a stores information relating to various hardware resources contained in a personal computer therein. When the personal computer contains a monitor, information about its resolution and the like is stored therein.

The extended BIOS reading unit 11c is a processor that reads information stored in the extended BIOS information storage unit 12b, and acquires monitor information included therein. Extended BIOS is such that manufacturers of the personal computers allow the nonvolatile memory or the like to store information about device constitutions according to a unique system therein, and the extended BIOS is utilized before the standard of SMBIOS is laid down.

Similarly to the SMBIOS information storage unit 12a, the extended BIOS information storage unit 12b also stores the information relating to various hardware resources contained in the personal computer therein. When the personal computer contains a monitor, information about its resolution or the like is stored therein.

The registry reading unit 11d is a processor that acquires monitor information stored in the registry information storage unit 12c using API prepared by OS. Registry indicates a database where the OS that runs on the personal computer manages various setting information in an integrated manner.

The registry information storage unit 12c stores information relating to various hardware resources as well as to the various software setting information therein. It stores information about resolution and the like of the monitor that is contained or is externally connected in/to the personal computer therein.

The monitor type identifying unit 11e is a processor that collates monitor information acquired by any one of the SMBIOS reading unit 11b, the extended BIOS reading unit 11c, and the registry reading unit 11d with information stored in the monitor type information storage unit 12d. The monitor type identifying unit 11e then identifies a type of the monitor contained in or externally connected to the personal computer. The monitor type information storage unit 12d is a storage unit that stores specification information of the monitor possibly contained in or externally connected to the personal computer therein.

As explained above, three systems that acquire monitor information are present. According to the present embodiment, the three systems are prioritized as follows, and when monitor information cannot be acquired by a higher priority system, it is then tried to be acquired by the next priority system.

The highest priority system is one that acquires the monitor information from the SMBIOS information storage unit 12a. This is because SMBIOS is the standard in the art, has high versatility, and is expected to be supported in the future. Furthermore, it is because since the information stored in the SMBIOS information storage unit 12a is stored as a part of hardware, the information is accurate.

The second-highest priority system is one that acquires the monitor information from the extended BIOS information storage unit 12b. The extended BIOS is a manufacturer's own specification. It has low versatility, and is more likely to be replaced by SMBIOS or the like in the future. However, since the information stored in the extended BIOS information storage unit 12b, is stored as a part of the hardware, the information is accurate, and thus this is effective to identify the type of the monitor accurately.

The lowest priority system is one that acquires the monitor information from the registry information storage unit 12c. The information stored in the registry information storage unit 12c is identified by OS as software, is possibly different from actual hardware. In this system, however, differently from the former two systems, even when the personal computer does not contain the monitor, and the monitor is externally connected to the personal computer, the information can be acquired.

When any system acquires the monitor information, the monitor information occasionally does not include information about monitor's type name. Even in this case, information about monitor's resolution can be obtained, and thus the monitor type identifying unit 11e collates the information about the monitor's resolution with the information in the monitor type information storage unit 12d, so as to identify the type of the monitor.

The processes executed by the processor in the controller 11 can be realized also by executing a prepared monitor-type identifying program on a computer. One example of the computer that executes the monitor-type identifying program is explained below with reference to FIG. 2.

Figure 2:
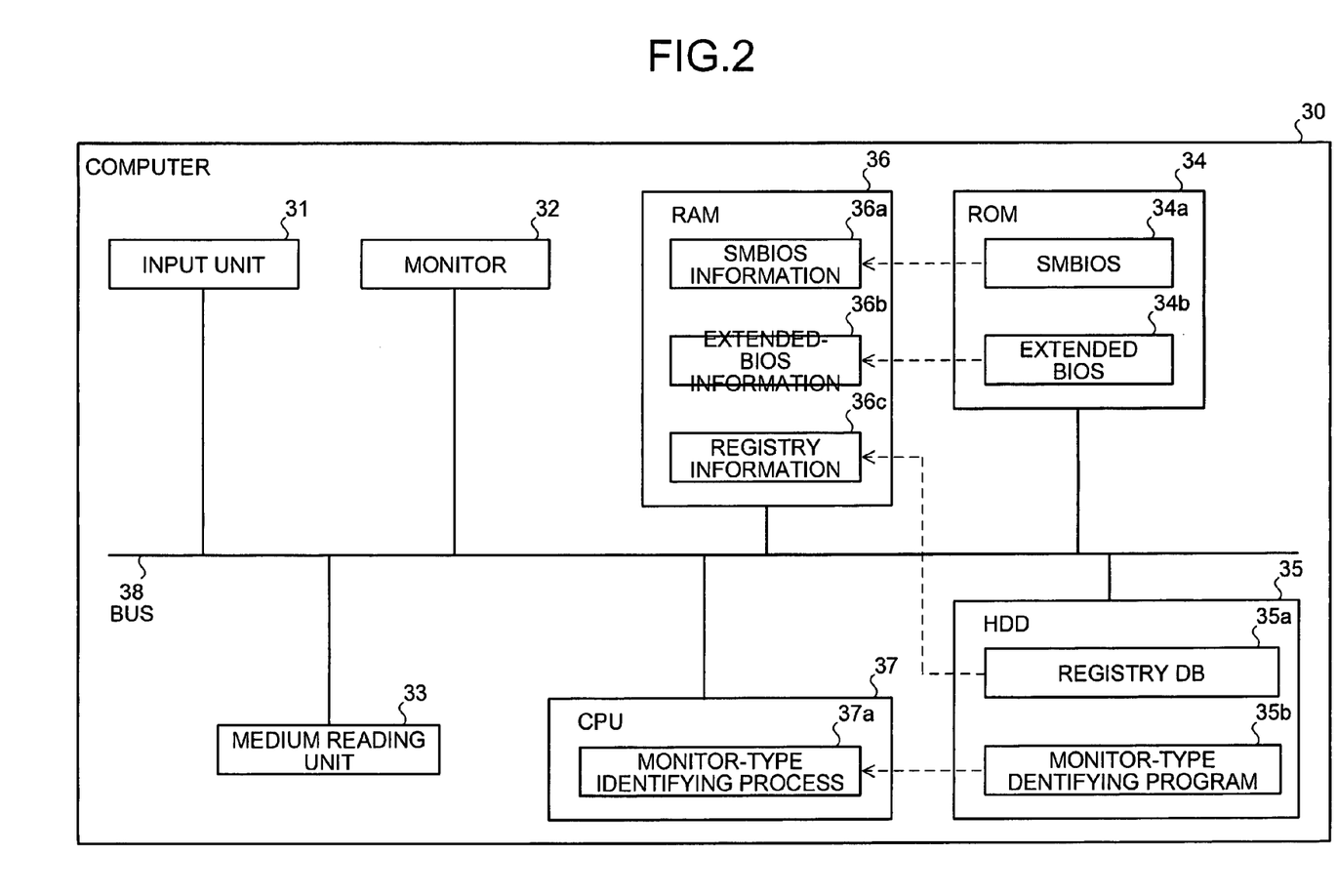
FIG. 2 is a block diagram of a computer that executes a monitor-type identifying program.

FIG. 2 is a block diagram of the computer that executes the monitor-type identifying program. As shown in FIG. 2, the computer 30 is constituted such that an input device 31, a monitor 32, a medium reading device 33, a read only memory (ROM) 34, a hard disk drive (HDD) 35, a random access memory (RAM) 36, and a central processing unit (CPU) 37 are connected by a bus 38.

The input device 31 is a device that accepts inputs from a user, such as a keyboard and a mouse. The monitor 32 is a display device such as a liquid crystal display device that displays character information, graphic information, and the like for the user. The monitor 32 is a target the present invention is to identify its type. The medium reading unit 33 is a unit that reads information from a storage medium such as a flexible disc (FD), a compact disk-read only memory (CD-ROM), a digital versatile disk-read only memory (DVD-ROM), a magneto-optical (MO) disc, or an integrated-circuit (IC) card.

The ROM 34 prestores SMBIOS 34a and extended BIOS 34b therein. The SMBIOS 34a and the extended BIOS 34b correspond to the SMBIOS information storage unit 12a and the extended BIOS storage unit 12b shown in FIG. 1, respectively.

The HDD 35 stores a registry database (DB) 35a and a monitor-type identifying program 35b therein. The registry DB 35a corresponds to the registry information storage unit 12d shown in FIG. 1. The monitor-type identifying program 35b is a program that executes the processes in the processors of the controller 11 shown in FIG. 1.

Figure 9:
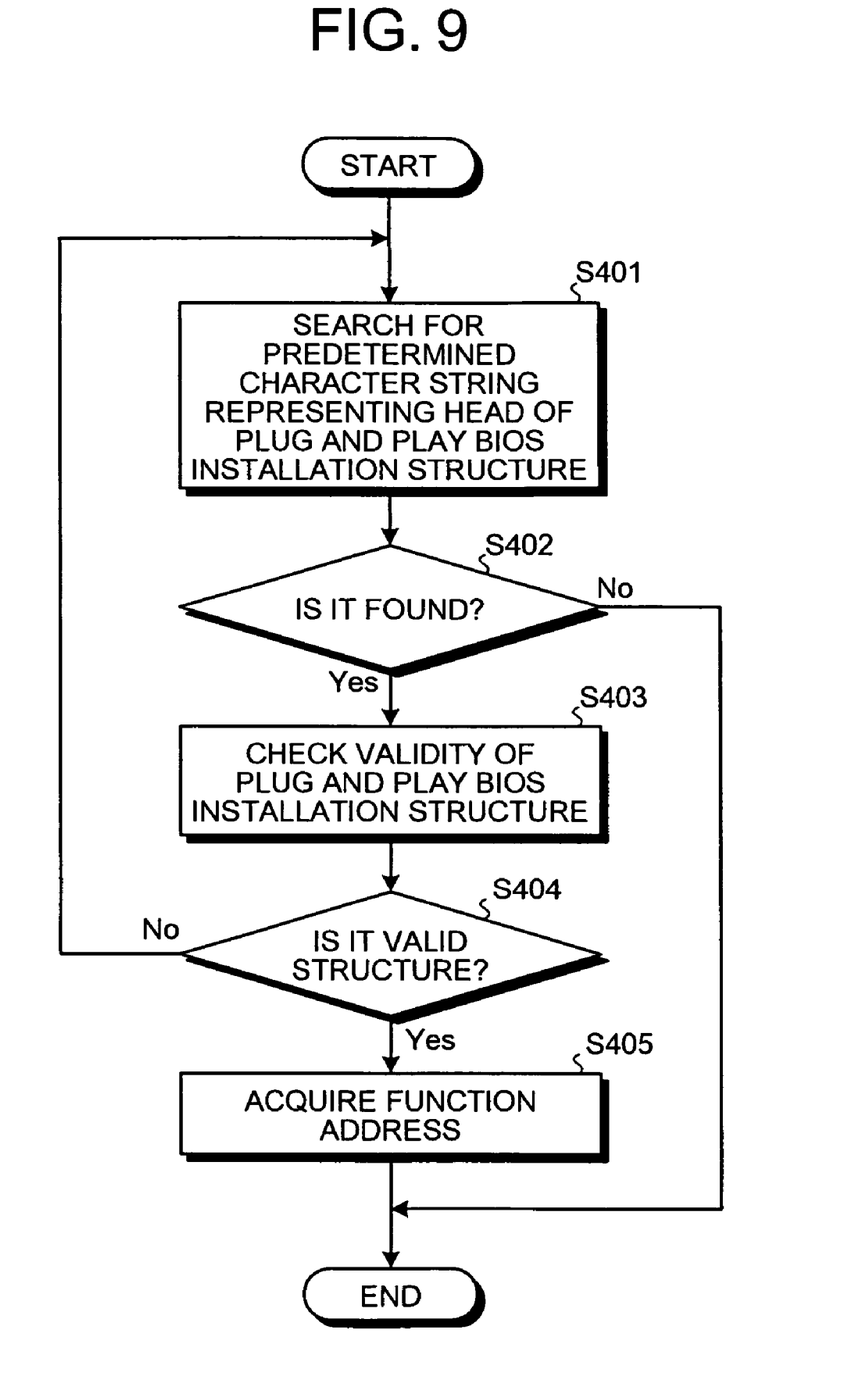
FIG. 9 is a flowchart of a procedure for acquiring a Plug and Play BIOS function address shown in FIG. 7.

The CPU 37 is an arithmetic unit that executes various programs. As shown in FIG. 9, when the CPU 37 reads the monitor-type identifying program 35b from the HDD 35 and executes it, the monitor-type identifying program 35b functions as the monitor type identifying process 37a.

In the monitor type identifying process 37a, the SMBIOS information 36a, the extended BIOS information 36b, and the registry information 36c are referred to, and a type of the monitor 32 is identified. The SMBIOS information 36a, the extended BIOS information 36b, and the registry information 36c are such that the CPU 37 develops information stored in the SMBIOS 34a, the extended BIOS 34b, and the registry DB 35a in the RAM 36, respectively.

It is not always necessary that the monitor-type identifying program 35b is stored in HDD 35, and thus the computer 30 may read and execute the monitor-type identifying program 35b that is stored in the computer-readable recording medium such as CD-ROM. As another manner, the monitor-type identifying program 35b is stored in another computer (or server) connected to the computer 30 via a public line, an internet, a local area network (LAN), a wide area network (WAN), or the like, and the computer 30 may read this program therefrom and execute it. The HDD 35 is one of the computer-readable recording medium.

Figure 3:
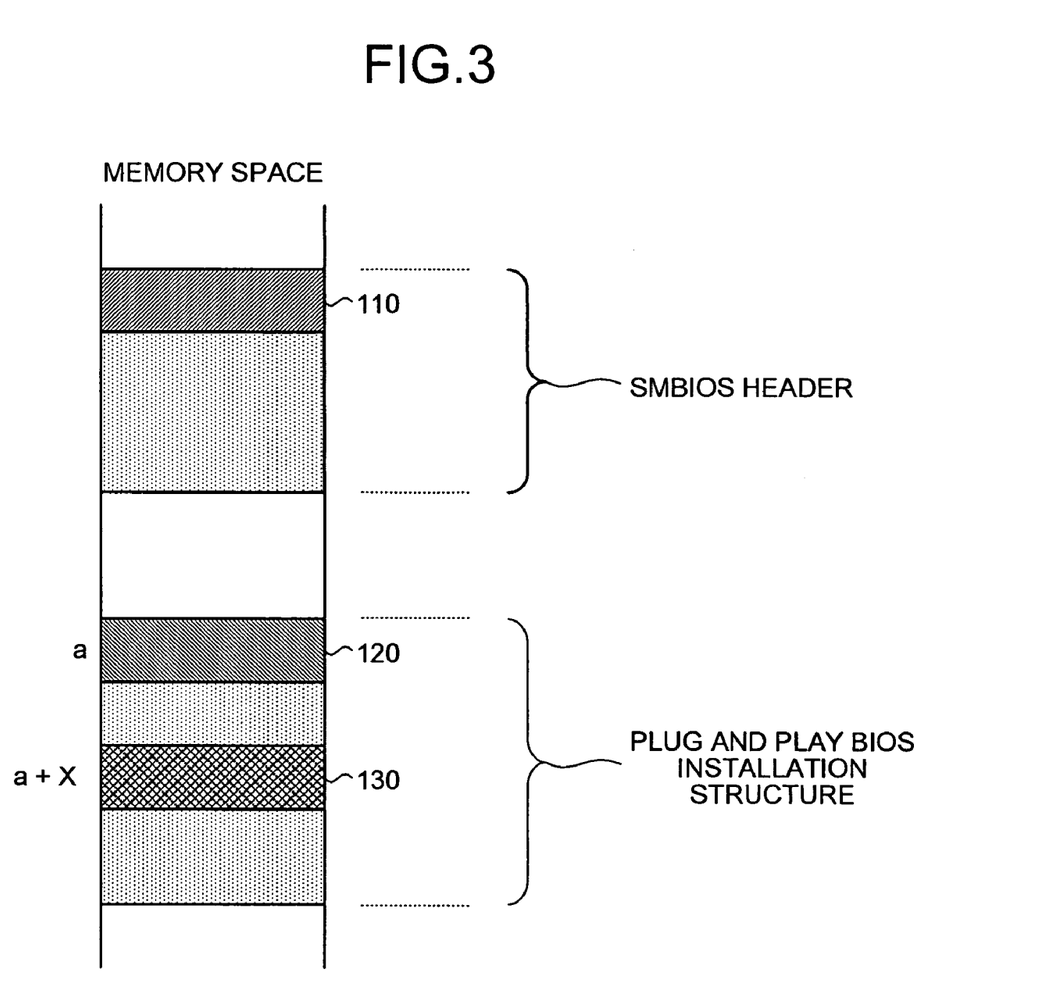
FIG. 3 is an explanatory diagram of a form that information for reading system management basic input/output system (SMBIOS) is mapped in a memory space.

FIG. 3 is an explanatory diagram of a form that information for reading SMBIOS is mapped in a memory space. As shown in FIG. 3, the information for reading the SMBIOS information is developed by OS in the memory space.

The monitor information stored in the SMBIOS information storage unit 12a is read on the basis that a target computer supports SMBIOS. As to whether SMBIOS is supported can be identified by presence of an SMBIOS header in the memory space.

A position of the SMBIOS header in the memory is not fixed, however, a predetermined character string is supposed to be stored in a head portion of a memory area 110, and the position can be found according to the character string. Since the character string is possibly stored in an area other than the SMBIOS header, it is necessary to specify the SMBIOS header after contents of the other items are referred to.

When it is identified that SMBIOS is supported, it is necessary to acquire a function address for reading the SMBIOS information. This address is stored in a Plug and Play BIOS Installation structure. A position of the structure in the memory is not fixed, however, a predetermined character string is supposed to be stored in a head portion of a memory area 120, and the position can be found according to the character string and by checking values of the other items.

A relative position of the function address with respect to the head of the structure is identified, and as shown in FIG. 9, it can be obtained by adding a size X of the relative position to an address "a" at the head of the structure. A function stored in the function address obtained in such a manner is called by giving a necessary parameter, so that the SMBIOS information can be read in a format of SMBIOS OEM Structure.

Figure 4:
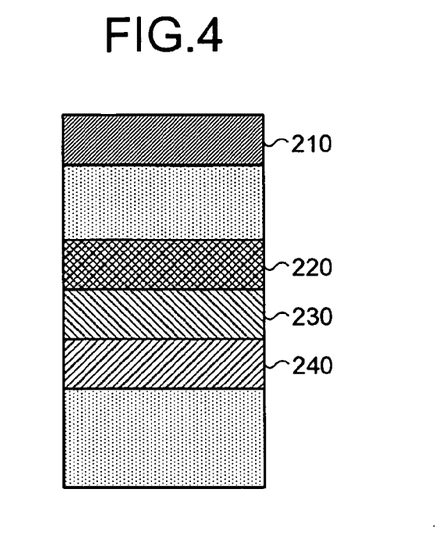
FIG. 4 is an explanatory diagram of a constitution of an SMBIOS original equipment manufacturer (OEM) structure.

FIG. 4 is an explanatory diagram of a constitution of the SMBIOS OEM Structure. Multiple types of the SMBIOS OEM Structures to be read as a result of calling the function are present. These SMBIOS OEM Structures include many types that store basic information about BIOS, other than one that stores hardware information. Determination can be made that the SMBIOS OEM Structure stores what information by referring to a value of a head memory area 210.

Even if the SMBIOS OEM Structure stores hardware information, it occasionally stores information about a device such as a network interface other than the monitor. Determination can be made by referring to a value of a memory area 220 as to what device information is stored in the SMBIOS OEM Structure.

When the memory area 210 and the memory area 220 are referred and one of the plural SMBIOS OEM Structure that stores the monitor information is found, resolution in a vertical direction and resolution in a lateral direction of the monitor can be acquired from memory areas 230 and 240. The SMBIOS OEM Structure that stores the monitor information therein is not necessarily always present, and for example, such data is not present in a computer without containing a monitor.

Figure 5:
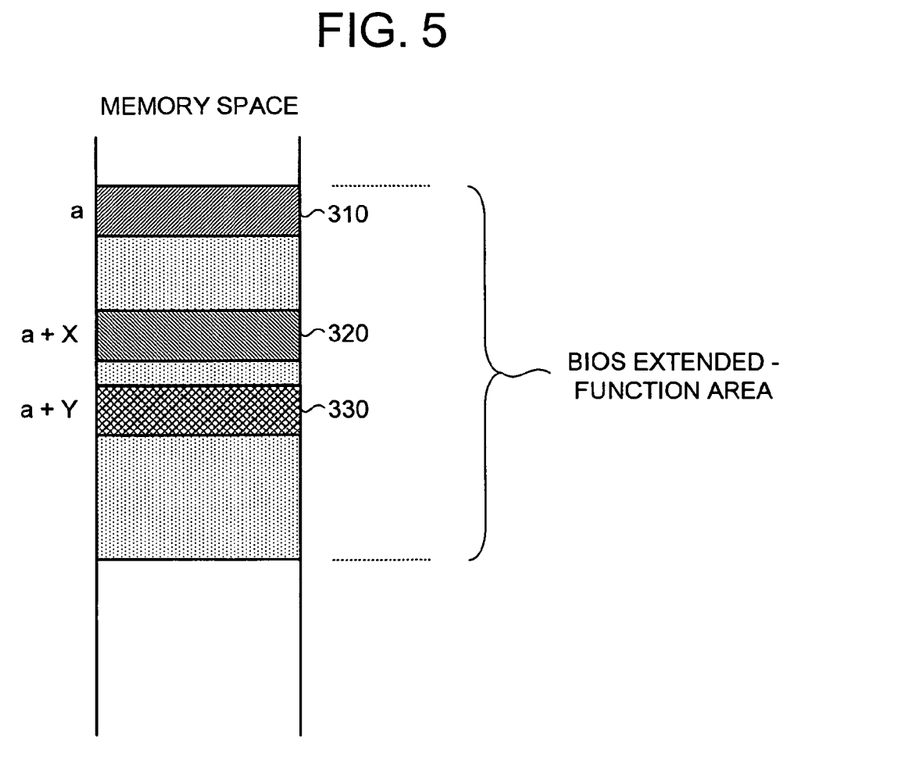
FIG. 5 is an explanatory diagram of a form that information about extended basic input/output system (BIOS) is mapped in the memory space.

FIG. 5 is an explanatory diagram of a form that information about extended BIOS is mapped in the memory area. As shown in FIG. 5, the information in the extended BIOS information storage unit 12b is developed in the memory space by OS.

The monitor information stored in the extended BIOS information storage unit 12b is read on condition that a target computer supports the extended BIOS. As to whether extended BIOS is supported can be identified by checking presence of a BIOS extended function area in the memory space. The BIOS extended function area is an area of the memory where the information in the extended BIOS information storage unit 12b is developed.

A position of the BIOS extended function area in the memory is not fixed, however, a predetermined character string is supposed to be stored in a head portion of a memory area 310, and the position can be found according to the character string. Since the character string may possibly be stored in an area other than the BIOS extended function area, it is necessary to specify the BIOS extended function area after contents of the other items are referred to.

When the BIOS extended function area is found, an area 320 is referred in order to check whether the computer contains a monitor. When the computer contains the monitor, a predetermined value is stored in the area 320, and a code representing the resolution of the monitor is stored in an area 330. Relative positions of the areas 320 and 330 with respect to the BIOS extended function area are set, and they can be obtained by calculations.

The codes stored in the area 330 and examples of their meanings are described below.

Code 0: 640 dots in horizontal direction, 480 dots in vertical direction

Code 1: 800 dots in horizontal direction, 600 dots in vertical direction

Code 2: 1024 dots in horizontal direction, 768 dots in vertical direction

Figure 6:
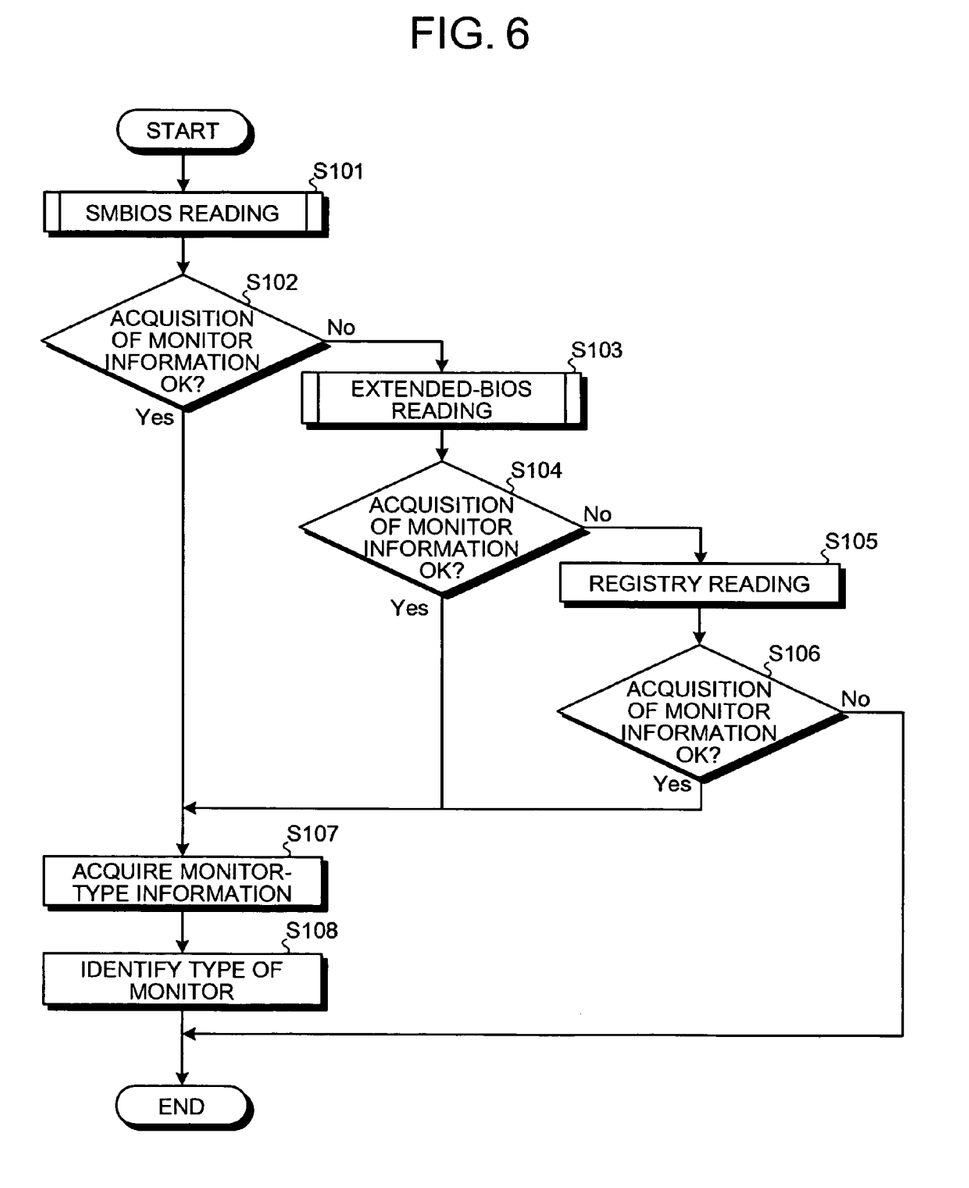
FIG. 6 is a flowchart of a processing procedure of the monitor type identifying apparatus shown in FIG. 1.

FIG. 6 is a flowchart of the processing procedure of the monitor type identifying device 10 shown in FIG. 1. As shown in FIG. 6, an SMBIOS reading process (mentioned later) is executed (step S101). When the monitor information cannot be acquired (No at step S102), an extended BIOS reading process (mentioned later) is executed (step S103). When the monitor information cannot be obtained (No at step S104), the monitor information is acquired from the registry information storage unit 12c using application program interface (API) of OS. When the monitor information cannot be acquired (No at step S106), the process ends, and a notification that the monitor cannot be identified is output.

When the monitor information can be acquired at any one of steps S101, S103, and S105 (Yes at step S102, Yes at step S104, or Yes at step S106), the monitor type information is read from the monitor type information storage unit 12d (step S107). The monitor type information is collated with the acquired monitor information so that the type of the monitor is identified (step S108), and an identified result is output. The information output in such a manner is utilized by an installation program or the like of the driver.

Figure 7:
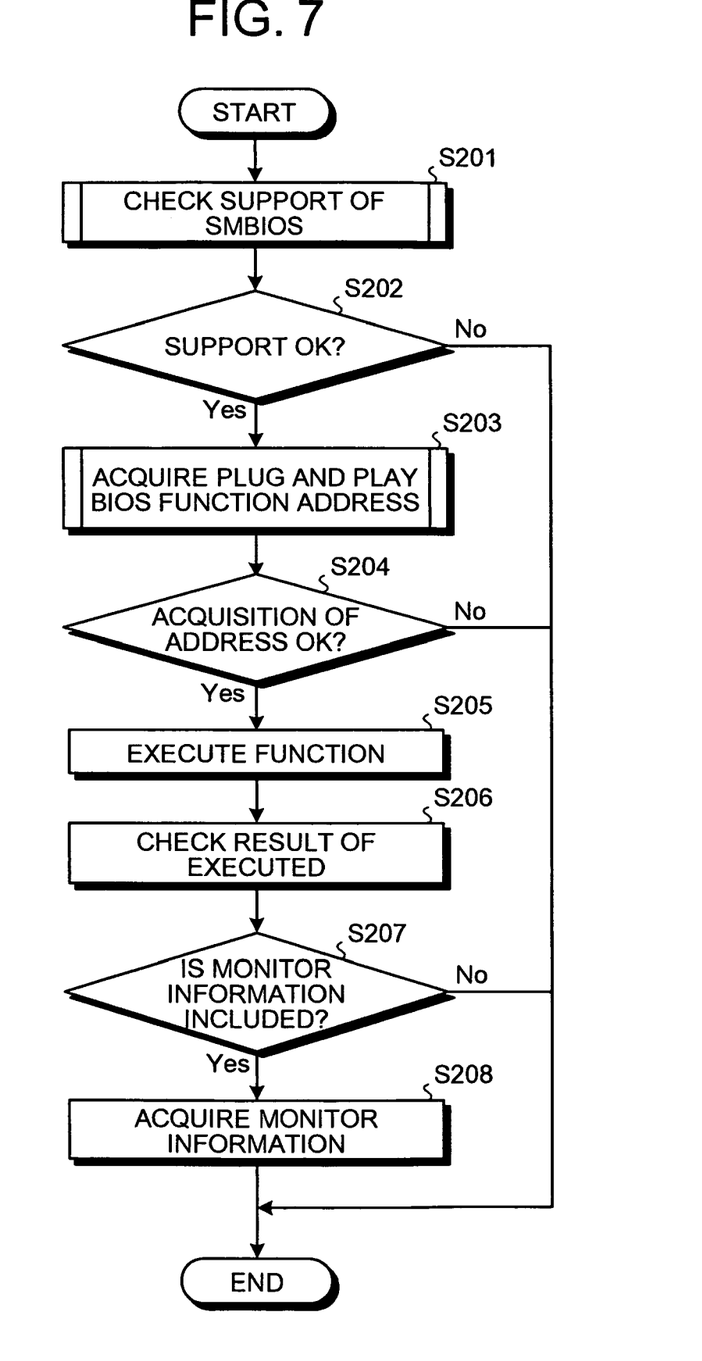
FIG. 7 is a flowchart of a procedure for reading SMBIOS shown in FIG. 6.

FIG. 7 is a flowchart of the SMBIOS reading procedure shown in FIG. 6. As shown in FIG. 7, a process for identifying SMBIOS is supported (mentioned later) is executed (step S201). When the computer finds that SMBIOS is not supported (No at step S202), the process ends, and a notification that the monitor information cannot be acquired is posted to a calling source.

When the support of SMBIOS is checked (Yes at step S202), a process for acquiring a Plug and Play BIOS function address (mentioned later) is executed (step S203). When a function address cannot be acquired (No at step S204), the process ends, and a notification that the monitor information cannot be acquired is posted to the calling source.

When the function address can be acquired (Yes at step S204), the function is executed using the acquired address (step S205), and a check is made whether information returned as a result includes the monitor information (step S206). When the returned information does not include monitor information (No at step S207), the process ends, and a notification that the monitor information cannot be acquired is posted to the calling source.

When the information returned as the result of executing the function includes monitor information, the monitor information is acquired (step S208), and the information is posted to the calling source.

Figure 8:
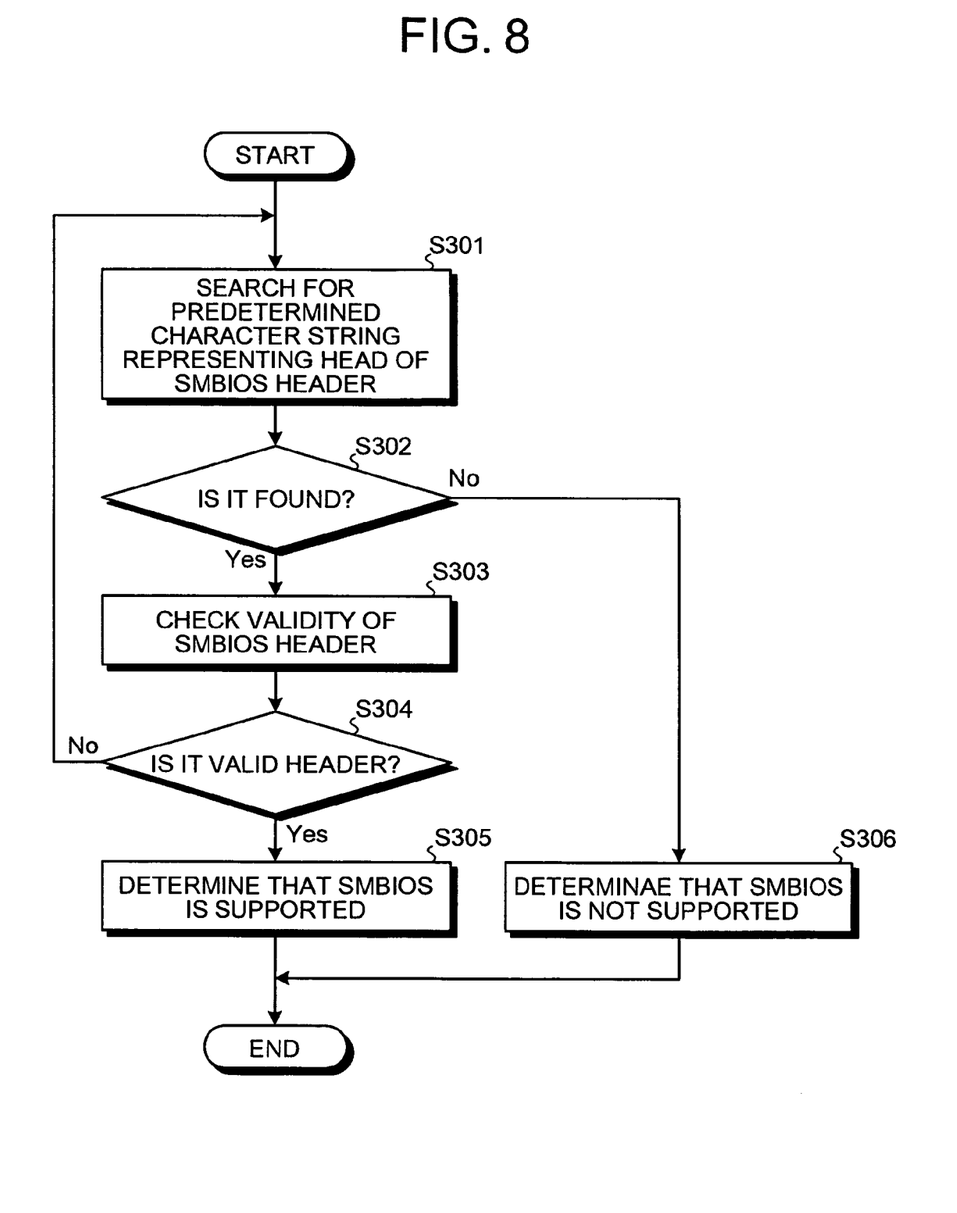
FIG. 8 is a flowchart of a procedure for checking support of SMBIOS shown in FIG. 7.

FIG. 8 is a flowchart of the procedure for checking the support of SMBIOS shown in FIG. 7. As shown in FIG. 8, the memory space is scanned, so that predetermined character string representing the head of a SMBIOS header is searched (step S301). When the character string is not found (No at step S302), the process ends, and a determination is made that the computer does not support SMBIOS (step S306), and a notification of it is posted to the calling source.

When the character string is found in the memory space (Yes at step S302), the SMBIOS header is supposed to exist in that position, and validity of other items at the header is identified (step S303). When the other items at the header are not identified valid (No at step S304), this area is not regarded as the SMBIOS header, and the sequence returns to step S301 so that the search for a predetermined character string is restarted.

When the other items at the header are identified to be valid at step S303 (Yes at step S304), a determination is made that the computer supports SMBIOS (step S305), and a notification of it is posted to the calling source.

FIG. 9 is a flowchart of the process for acquiring the Plug and Play. BIOS function address shown in FIG. 7. As shown in FIG. 9, the memory space is scanned, and a predetermined character string representing a head of a Plug and Play BIOS Installation structure is searched (step S401). When the character string is not found (No at step S402), the process ends, and information that a function address cannot be acquired is posted to the calling source.

When the character string is found in the memory space (Yes at step S402), the Plug and Play BIOS Installation structure is supposed to be present in that position, and validity of other items in the structure is identified (step S403). When the other items in the structure are identified valid (No at step S404), this area is not regarded as the Plug and Play BIOS Installation structure, and the sequence returns to step S401 so that the search for a predetermined character is restarted.

When the other items in the structure are not identified valid at step S403 (Yes at step S404), a function address is acquired from the predetermined position of the structure (step S405), and the address is posted to the calling source.

Figure 10:
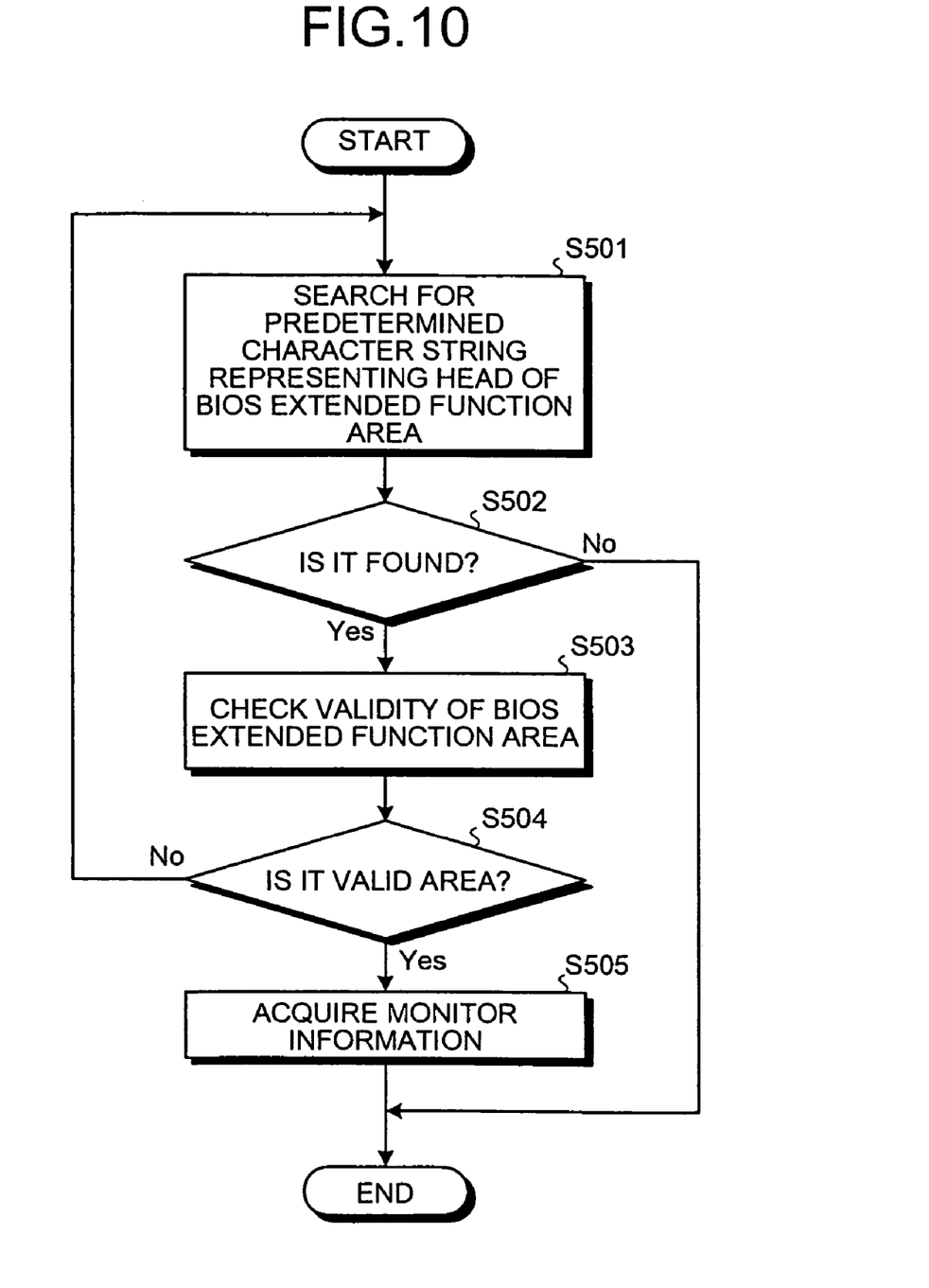
FIG. 10 is a flowchart of a procedure for reading extended BIOS shown in FIG. 6.

FIG. 10 is a flowchart of the procedure for reading the extended BIOS shown in FIG. 6. As shown in FIG. 10, the memory space is scanned, and a predetermined character string representing a head of the BIOS extended function area is searched (step S501). When the character string is not found (No at step S502), the process ends, and a notification that monitor information cannot be acquired is posted to the calling source.

When the character string is found in the memory space (Yes at step S502), the BIOS extended function area is supposed to be present in that position, and validity of other items in the BIOS extended function area is identified (step S503). When the other items in the BIOS extended function area are not identified valid (No at step S504), this area is not regarded as the BIOS extended function area, and the procedure returns to step S501 so that the search for a predetermined character string is restarted.

When the other items in the BIOS extended function area are identified valid at step S503 (Yes at step S504), monitor information is acquired from a predetermined position in the BIOS extended function area (step S505), and the information is returned to the calling source.

According to the present embodiment, the three systems for acquiring monitor information are sequentially utilized in descending order of accuracy, so that a type of a monitor is identified by using monitor information firstly acquired. Therefore, the type of the monitor connected to the information processing apparatus can be identified accurately.

Furthermore, according to the present embodiment, while the peripheral-type identifying apparatus, the peripheral type identifying program, and the peripheral-type identifying method according to the present invention are used to identify types of monitors, they can be also applied to determination of types of peripherals other than the monitors connected to the information processing apparatus.

Moreover, according to the present invention, the peripheral information acquiring systems are applied according to the application order predetermined by the accuracy of acquired information, and a type of a peripheral is identified based on the firstly acquired peripheral information. Accordingly, the type of the peripheral can be identified accurately.

Furthermore, according to the present invention, when resolution information about the peripheral can be acquired, a type of a peripheral can be identified. Accordingly, even when type name information about the peripheral cannot be acquired, the type of the peripheral can be identified.

Moreover, according to the present invention, a type of a peripheral is identified by using peripheral information embedded into the information processing apparatus. Accordingly, the type of the peripheral can be identified based on reliable information, and thus the type of the peripheral can be identified accurately.

Furthermore, according to the present invention, information for acquiring peripheral information is acquired by using a predetermined pattern. Accordingly, accurate information for determination can be acquired.

Moreover, according to the present invention, a type of a peripheral is identified by using setting information of OS. Accordingly, even when the peripheral information is not embedded into the information processing apparatus, the type of the peripheral can be identified accurately.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus for identifying a type of a peripheral connected to an information processing apparatus, the apparatus comprising:
    a peripheral-information reading unit that reads and acquires information relating to the peripheral from the information processing apparatus using at least one of systems whose application order is predetermined;
    a peripheral-information storing unit that stores in advance specification information of a peripheral to be connected to the information processing apparatus; and
    a peripheral-type identifying unit that collates the information acquired by the peripheral-information reading unit with the specification information stored in the peripheral-information storing unit to identify the type of the peripheral connected to the information processing apparatus, wherein the peripheral-information reading unit includes:
    an SMBIOS reading unit that reads information stored in an SMBIOS information storage unit to acquire the information relating to the peripheral;
    an extended BIOS reading unit that reads information stored in an extended BIOS information storage unit to acquire the information relating to the peripheral, when the SMBIOS reading unit cannot acquire the information relating to the peripheral from the SMBIOS information storage unit; and
    a registry reading unit that reads information stored in a registry information storage unit to acquire the information relating to the peripheral, when the extended BIOS reading unit cannot acquire the information relating to the peripheral from the extended BIOS information storage unit.

2. The apparatus according to claim 1, wherein the information includes at least resolution information of the peripheral connected to the information processing apparatus.

3. The apparatus according to claim 1 wherein the peripheral-information reading unit reads standard basic input/output system information of the information processing apparatus, and acquires the information from the standard basic input/output system information read.

4. The apparatus according to claim 3, wherein the peripheral-information reading unit finds a position, where a predetermined data pattern exists, from a memory space managed by an operating system, and acquires address information for acquiring the standard basic input/output system information using the position as a reference.

5. The apparatus according to claim 1, wherein the peripheral-information reading unit reads, when the information is hard to acquire using other systems, extended basic input/output system information held by extended basic input/output system mounted by a manufacturer of the information processing apparatus according to a unique standard, and acquires the information from the extended basic input/output system information read.

6. The apparatus according to claim 5, wherein the peripheral-information reading unit finds a position, where a predetermined data pattern exists, from a memory space managed by an operating system, and acquires the extended basic input/output system information using the position as a reference.

7. The apparatus according to claim 1, wherein the peripheral-information reading unit reads, when the information is hard to acquire using other systems, setup information held by a registry managed by an operating system running on the information processing apparatus, and acquires the information from the setup information.

8. A method of identifying a type of a peripheral connected to an information processing apparatus, the method comprising:
    reading and acquiring information relating to the peripheral from the information processing apparatus using at least one of systems whose application order is predetermined; and
    collating the information acquired with specification information stored in a peripheral-information storing unit that stores the specification information of a peripheral to be connected to the information processing apparatus to identify the type of the peripheral connected to the information processing apparatus, wherein the reading includes:
    reading information stored in an SMBIOS information storage unit to acquire the information relating to the peripheral;
    reading information stored in an extended BIOS information storage unit to acquire the information relating to the peripheral, when the information relating to the peripheral cannot be acquired from the SMBIOS information storage unit; and
    reading information stored in a registry information storage unit to acquire the information relating to the peripheral, when the information relating to the peripheral cannot be acquired from the extended BIOS information storage unit.

9. The method according to claim 8, wherein the information includes at least resolution information of the peripheral connected to the information processing apparatus.

10. The method according to claim 8, wherein the reading includes
    reading standard basic input/output system information of the information processing apparatus; and
    acquiring the information from the standard basic input/output system information read.

11. The method according to claim 10, wherein the reading includes
- finding a position, where a predetermined data pattern exists, from a memory space managed by an operating system; and
- acquiring address information for acquiring the standard basic input/output system information using the position as a reference.

12. The method according to claim 8, wherein the reading includes
- reading, when the information is hard to acquire using other systems, extended basic input/output system information held by extended basic input/output system mounted by a manufacturer of the information processing apparatus according to a unique standard; and
- acquiring the information from the extended basic input/output system information read.

13. The method according to claim 12, wherein the reading includes
- finding a position, where a predetermined data pattern exists, from a memory space managed by an operating system; and
- acquiring the extended basic input/output system information using the position as a reference.

14. The method according to claim 8, wherein the reading includes
- reading, when the information is hard to acquire using other systems, setup information held by a registry managed by an operating system running on the information processing apparatus; and
- acquiring the information from the setup information.

15. A computer-readable recording medium that stores a computer program for identifying a type of a peripheral connected to an information processing apparatus, wherein the computer program makes a computer execute:
- reading and acquiring information relating to the peripheral from the information processing apparatus using at least one of systems whose application order is predetermined;
- storing specification information of a peripheral to be connected to the information processing apparatus; and
- collating the information acquired with the specification information stored at the storing to identify the type of the peripheral connected to the information processing apparatus, wherein the reading includes:
- reading information stored in an SMBIOS information storage unit to acquire the information relating to the peripheral;
- reading information stored in an extended BIOS information storage unit to acquire the information relating to the peripheral, when the information relating to the peripheral cannot be acquired from the SMBIOS information storage unit; and
- reading information stored in a registry information storage unit to acquire the information relating to the peripheral, when the information relating to the peripheral cannot be acquired from the extended BIOS information storage unit.

16. The computer-readable recording medium according to claim 15, wherein the information includes at least resolution information of the peripheral connected to the information processing apparatus.

17. The computer-readable recording medium according to claim 15, wherein the reading includes
- reading standard basic input/output system information of the information processing apparatus; and
- acquiring the information from the standard basic input/output system information read.

18. The computer-readable recording medium according to claim 17, wherein the reading includes
- finding a position, where a predetermined data pattern exists, from a memory space managed by an operating system; and
- acquiring address information for acquiring the standard basic input/output system information using the position as a reference.

19. The computer-readable recording medium according to claim 15, wherein the reading includes
- reading, when the information is hard to acquire using other systems, extended basic input/output system information held by extended basic input/output system mounted by a manufacturer of the information processing apparatus according to a unique standard; and
- acquiring the information from the extended basic input/output system information read.

20. The computer-readable recording medium according to claim 19, wherein the reading includes
- finding a position, where a predetermined data pattern exists, from a memory space managed by an operating system; and
- acquiring the extended basic input/output system information using the position as a reference.

21. The computer-readable recording medium according to claim 15, wherein the reading includes:
- reading, when the information is hard to acquire using other systems, setup information held by a registry managed by an operating system running on the information processing apparatus; and
- acquiring the information from the setup information.

* * * * *

UNITED STATES PATENT AND TRADEMARK OFFICE
CERTIFICATE OF CORRECTION

PATENT NO. : 7,543,083 B2
APPLICATION NO. : 11/027986
DATED : June 2, 2009
INVENTOR(S) : Tasuku Hayakawa et al.

It is certified that error appears in the above-identified patent and that said Letters Patent is hereby corrected as shown below:

Column 10, Line 1, change "1" to --1,--.

Column 10, Lines 7-8, change "position, where a predetermined data pattern exists," to --portion for a set of data--.

Column 10, Line 11, change "position" to --portion--.

Column 10, Lines 21-22, change "position, where a predetermined data pattern exists," to --portion--.

Column 10, Line 24, change "position" to --portion--.

Column 10, Line 63, after "includes" insert --:--.

Column 11, Line 2, after "includes" insert --:--.

Column 11, Lines 3-4, change "position, where a predetermined data pattern exists," to --portion for a set of data--.

Column 11, Line 7, change "position" to --portion--.

Column 11, Line 10, after "includes" insert --:--.

Column 11, Line 19, after "includes" insert --:--.

Column 11, Lines 20-21, change "position, where a predetermined data pattern exists," to --portion for a set of data--.

Column 11, Line 24, change "position" to --portion--.

Column 11, Line 26, after "includes" to --:--.

Column 12, Line 14, after "includes" insert --:--.

Column 12, Line 20, after "includes" insert --:--.

Column 12, Lines 21-22, change "position, where a predetermined data pattern exists," to --portion for a set of data--.

Column 12, Line 25, change "position" to --portion--.

CERTIFICATE OF CORRECTION (continued)
U.S. Pat. No. 7,543,083 B2

Column 12, Line 28, after "includes" insert --:--.

Column 12, Line 37, after "includes" insert --:--.

Column 12, Lines 38-39, change "position, where a predetermined data pattern exists," to --portion for a set of data--.

Column 12, Line 42, change "position" to --portion--.

Signed and Sealed this

Thirtieth Day of March, 2010

David J. Kappos
*Director of the United States Patent and Trademark Office*